United States Patent Office 2,809,169
Patented Oct. 8, 1957

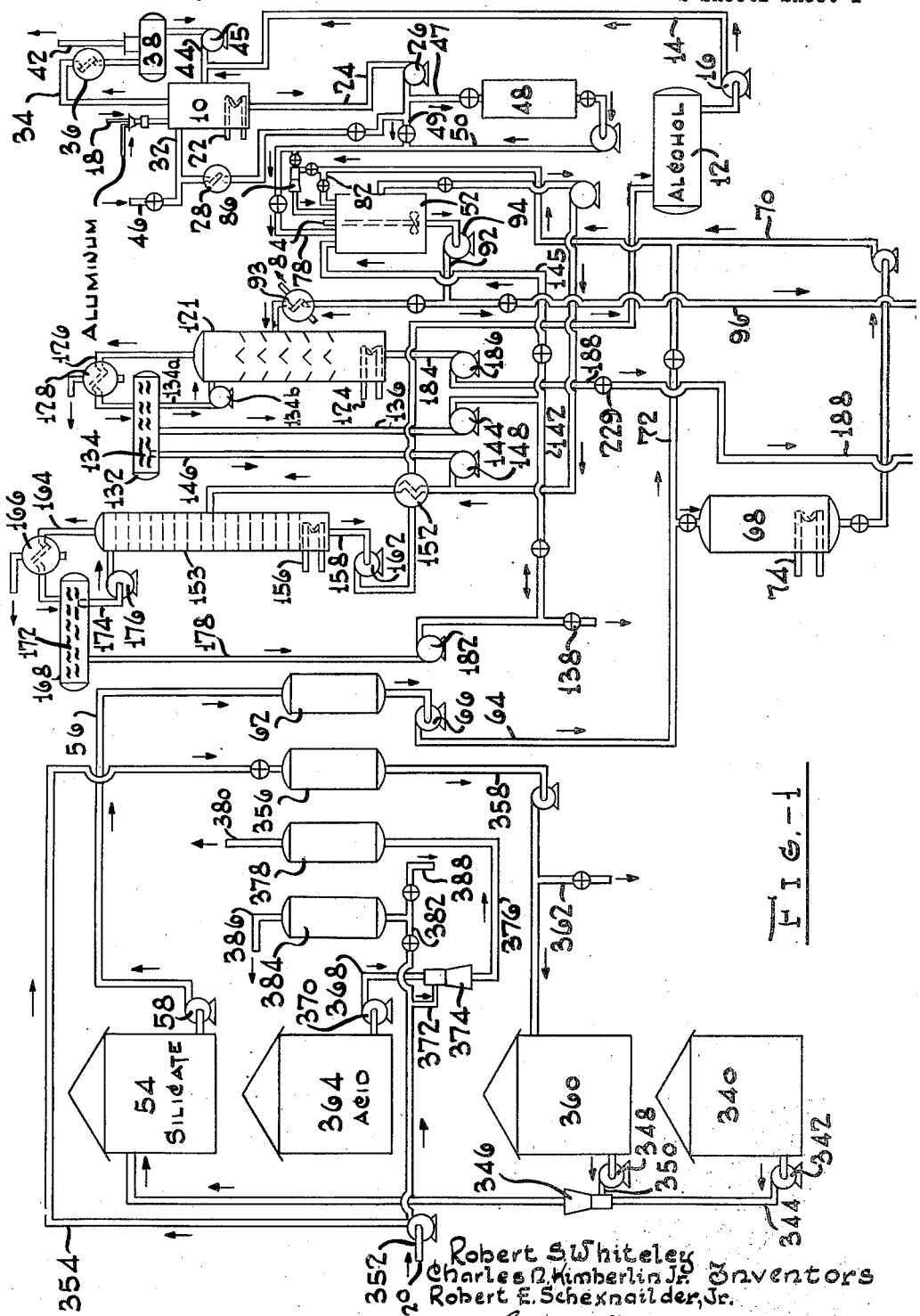

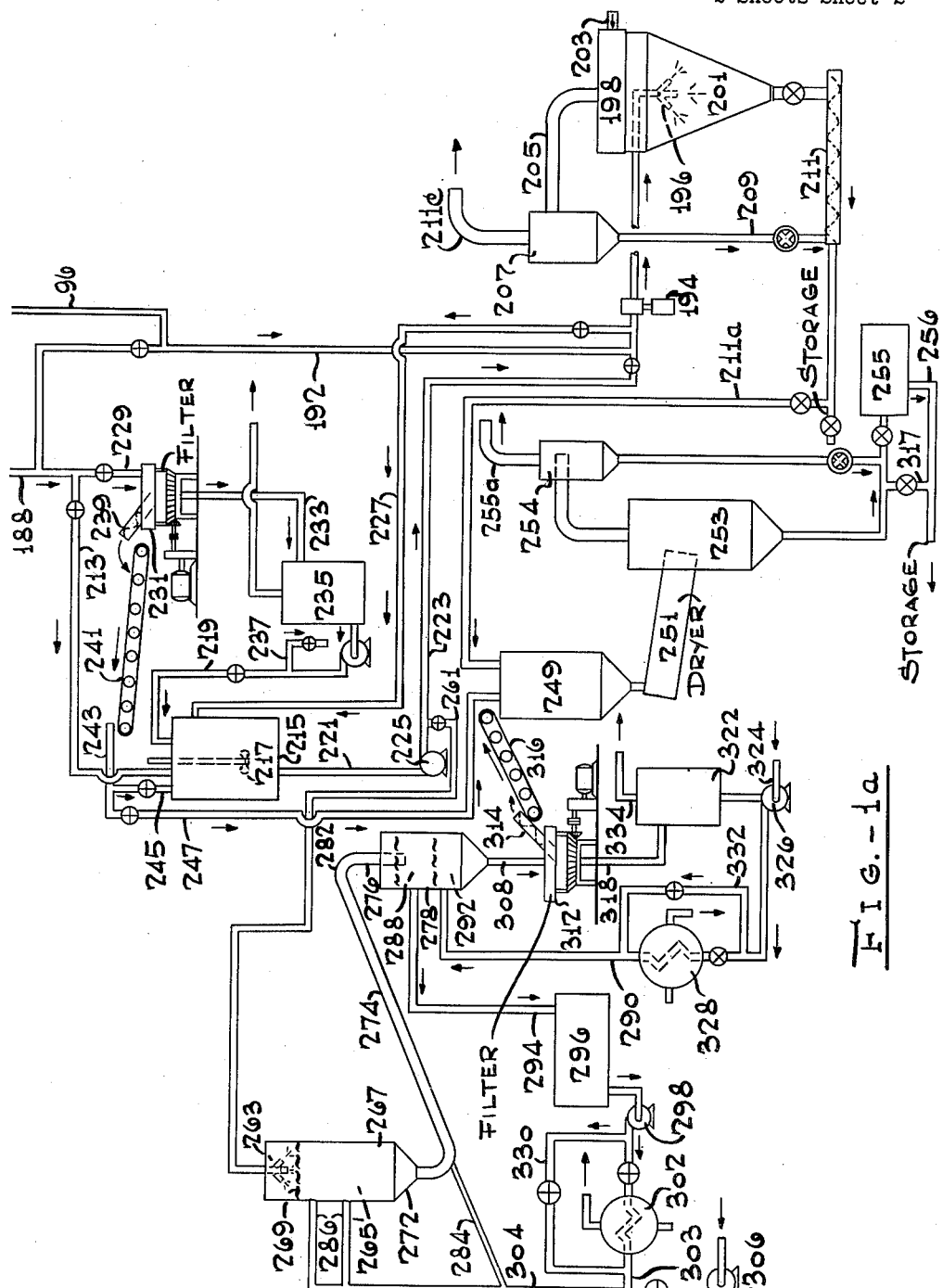

2,809,169

PROCESSES FOR THE MANUFACTURE OF CATALYSTS

Robert S. Whiteley, Charles N. Kimberlin, Jr., and Robert E. Schexnailder, Jr., Baton Rouge, La., assignors to Esso Research and Engineering Company, a corporation of Delaware Application October 6, 1951, Serial No. 250,052

1 Claim. (Cl. 252—448)

This invention relates to an improved process for the manufacture of catalysts and more particularly relates to the manufacture of synthetic silica alumina catalysts adapted for use in the catalytic conversion of hydrocarbons.

According to the present invention, a silica hydrosol made by percolating or contacting a sodium silicate or other alkali metal silicate solution with a cation exchange material is mixed with aluminum alcoholate to hydrolyze the alcoholate and form a mixture containing silica and alumina, the mixture being further treated to recover the alcohol and to treat the silica-alumina mixture and to produce a catalyst. During hydrolysis the mixture is agitated to form a pumpable slurry of gelled particles.

According to the present process there is less water to evaporate from the silica-alumina slurry and therefor the present process is cheaper than competitive processes. Also a catalyst is produced which is more active and superior to catalysts made by competitive processes.

In the drawings, Figs. 1 and 1a represent one form of apparatus adapted to carry out the process of the present invention.

Referring now to the drawing, the reference character 10 designates a reactor in which aluminum metal in the form of chips, shot, turnings, ingots or the like is reacted with a substantially anhydrous alcohol preferably an aliphatic alcohol such as amyl alcohol or commercial mixtures containing amyl alcohol or commercial mixtures containing isomeric amyl alcohols. Water soluble alcohols such as ethyl, isopropyl or normal propyl alcohols may be used but preferably $C_5$ and higher aliphatic alcohols which are liquid at the temperature of operation of the process are used because they are less soluble in water and more easily recovered in the process. Or mixtures of different alcohols may be used. In some cases a selected hydrocarbon, such as heptane, octane, toluene, xylene, etc., or a hydrocarbon fraction such as a petroleum distillate boiling within the range of 200° to 500° F. or higher is added to the alcohol selected. It is preferred to use a petroleum distillate of narrow boiling range which includes the boiling range of the alcohol used; for example, for use with mixed amyl alcohols a petroleum cut boiling within the range of 220° to 290° F. is satisfactory.

For purposes of illustration the process of the present invention will be described using a mixture of equal volumes of amyl alcohol and a petroleum hydrocarbon fraction boiling in the range of 220° to 290° F. Alcohol-hydrocarbon mixture from storage tank 12 is passed through line 14 by pump 16 into reactor 10. A small amount of catalytic material such as mercuric chloride is preferably used but other catalysts such as mercury salts, iodine, aluminum halide, etc. may be used. The catalyst may be added with the aluminum metal through line 18 or may be added through a separate line. One method of introducing the mercuric chloride is to mix the aluminum metal with a solution of mercuric chloride in the alcohol-hydrocarbon liquid in a separate vessel (not shown) and then drain off the liquid, sufficient mercuric chloride being left on the aluminum to act as a catalyst when the metal is introduced into reactor 10.

Instead of using aluminum metal in an untreated form in reactor 10, the aluminum metal may be activated before being introduced into reactor 10 and the activated aluminum is then protected from the deleterious effects of the air. For activation, the aluminum is contacted with an aqueous solution of mercuric nitrate or similar salt in the presence of excess acid such as nitric acid. After contacting for a suitable length of time, the activated aluminum is withdrawn upward from the aqueous layer through an overlying layer of liquid water immiscible alcohol or alcohol-hydrocarbon mixture. The surface of the metal having been amalgamated at least slightly is preferentially wet by the alcohol during withdrawal. A slight amount of agitation may be imparted to the activated aluminum metal during the withdrawal to complete the removal of droplets of the aqueous phase. The activated aluminum may then be removed into the air for any future use as the retention of the hydrocarbons on the metal surface prevents rapid deterioration of the active state by oxidation.

Prevention of the contact with air of the aluminum metal before introducing the metal into reactor 10 permits use of lesser amounts of mercury compounds as catalysts during the reaction. Preferably the aluminum metal is introduced into the aqueous treating phase without passage through the alcohol or alcohol-hydrocarbon layer.

Reactor 10 may be maintained at superatmospheric pressure of about 5 to 100 lbs. per sq. in. gauge, if desired. The superatmospheric pressure raises the boiling point of the alcohol and hydrocarbon and aids in their retention in the reaction system. However, it is preferred to carry out the operation at atmospheric pressure. The amount of catalyst used may be between 0.0001 and 0.01, preferably about 0.001 part of mercuric chloride per part of aluminum metal by weight. By using more mercuric chloride as for example 0.005 part of $HgCl_2$ per part of Al metal by weight, the rate of reaction can be increased and by using less $HgCl_2$, as for example 0.0005 part $HgCl_2$ per part of Al metal the rate of reaction can be decreased.

It is usually necessary to heat the mixture in reactor 10 to initiate the reaction between the aluminum and the alcohol and one form of a heating means such as heating coil 22 is shown but other methods of heating may be used. After the reaction is well started, the reaction becomes rapid and it is usually necessary to cool the contents of reactor 10. The contents of reactor 10 are heated initially to a temperature of about 200° to 300° F., preferably about 240° F. The temperature maintained in the reactor will depend upon the particular alcohol and petroleum hydrocarbon fraction used and upon the pressure that it is desired to maintain.

While it is necessary to use anhydrous alcohols for reaction with aluminum at the beginning of the process, it has been found that once the reaction between the aluminum and the anhydrous alcohol is proceeding in reactor 10, the alcohol added later to the reactor may contain water in an amount up to about 1% by weight of the alcohol or alcohol-hydrocarbon mixture used in the reaction.

Steam or other heating mediums may be used in coil 22. The cooling may be done by passing a cooling medium through coil 22 instead of a heating medium to remove the heat produced by reaction of the aluminum with the alcohol. Preferably the reactor is maintained at a temperature of about 200° to 300° F. during the reaction. Another method of maintaining the desired temperature of the reactor is to withdraw a part of the liquid contents of reactor 10 through line 24 by pump 26 and pass the withdrawn mixture through a cooler 28 and line 32 back to the reactor 10. The withdrawn mixture is cooled to a temperature of about 80° to 150° F., preferably about 100° F. before being returned to the reactor.

The reactor may be operated either batchwise or continuously. If desired, more than one reactor may be employed; these may be operated either in parallel or in series.

The aluminum and alcohol react to form aluminum alcoholate or aluminum alkoxide and hydrogen. Vapors and gases pass overhead through line 34 and reflux condenser 36 from which condensed liquid and hydrogen pass into separator 38. Hydrogen which is substantially pure is withdrawn through line 42. The hydrogen which is about 100% pure after removing the residual condensible vapors can be recovered as such. A pressure release valve (not shown) may be provided for line 42. The reflux liquid is withdrawn from separator 38 and returned through line 44 by pump 45 to reactor 10 to furnish additional cooling. Suitable intrumentation such as is known to those skilled in the art may be provided for controlling reactor temperature, reactor pressure and the amount of alcohol and hydrocarbon carried up by the hydrogen to condenser 36.

At the beginning of the operation before the alcohol is pumped into reactor 10, the reactor is sealed and purged of air with inert gas such as flue gas, nitrogen and the like, which may be introduced through line 46 and passed into the reactor via line 32. The inert gas is vented via line 34 through cooler 36, knockout drum 38 and line 42. After a run is completed and before the reactor is again opened to the atmosphere, inert gas is used to purge the reactor of hydrogen.

The aluminum alcoholate and alcohol liquid mixture is then withdrawn from reactor 10 through line 24, and passed through line 47 to storage tank 48 or through by-pass line 49 to a mixing tank 52 later to be described in greater detail.

The preparation of the silica hydrosol will now be described. The silica hydrosol is prepared by contacting a sodium silicate or other alkali metal silicate solution, preferably a dilute solution, with a column of substantially stationary granular cation exchange material. However, the silica hydrosol may be prepared by first slurrying the sodium silicate solution with a granular cation exchange material while maintaining the slurry on the acid side and then passing the silica hydrosol through a column of substantially stationary granular cation exchange material to remove residual sodium as described in copending Bilisoly, Kimberlin and Segura application Serial No. 246,968 on "Processes for the Manufacture of Silica Hydrosols," filed September 15, 1951, now abandoned.

Or the sodium silicate solution may be first mixed with an acid such as sulfurous acid, acetic acid or the like to form an acidic silica hydrosol and the resulting mixture is contacted with granular cation exchange material maintained at a substantially sationary column to produce a substantially pure silica hydrosol as disclosed in Hunter copending application Serial No. 235,111 on "Processes for the Manufacture of Silica Hydrosols," filed July 3, 1951, now abandoned, and Kimberlin copending application Serial No. 239,612 on "Processes for the Manufacture of Silica Hydrosols," filed July 31, 1951, now U. S. Patent No. 2,726,216. Other methods of making the silica hydrosol may be used where the silica hydrosol is produced by a cation exchange material and the present invention is not to be limited to any particular process described.

Any of the commercially available alkali metal silicates can be used as those from $Na_2O:SiO_2$ to $Na_2O:3.9SiO_2$, preferably those from $Na_2O:2.6SiO_2$ to $Na_2O:3.5SiO_2$. The sodium silicate is preferably diluted so that it contains not more than about 150 gm. of $SiO_2$ per liter and preferably not more than about 70–80 gm. of $SiO_2$ per liter. The exchange rate or rate of flow of diluted alkali metal silicate through the cation exchange material may vary between about 0.3 and 5.0 gallons per minute per cubic foot of resin when producing silica hydrosol from a sodium silicate solution using granular Amberlite resin IR-120. Preferably room temperature is used during the exchange step.

As the exchange material the preferred one is a resin of the acid regenerated cation exchange type. Such cation exchange resins are available as commercial products. These exchange resins are obtained by condensing aldehydes such as formaldehyde with phenols or with phenol-sulfonic acids or with phenol-carboxylic acids or the like. The sulfonic acid type resin or strong acid type resin is preferred such as the IR-120 Amberlite resin. Other exchange materials which may be used are sulfuric acid treated coal, or wood or waste petroleum sludge or lignite or the like. Also the sulfonated polystyrene type exchange resins may be used. These exchange materials are treated with an acid such as sulfuric acid or hydrochloric acid or the like to put them in the hydrogen cycle for use in removing cations or sodium in this particular case. Exchange resins are sold by Resinous Products and Chemical Company under the name of Amberlite.

The quantity of sodium silicate used should not exceed the amount that can be substantially freed of soda by the cation exchange resin, that is, the capacity of the resin for substantially complete soda removal should not be exceeded. The silica hydrosol leaving the cation exchange resin or other exchange material should not contain more than about 0.2% soda ($Na_2O$), preferably below 0.05% soda calculated on a dry basis. After the cation exchange material has been used for some time, it is necessary to regenerate it and this will be described generally now and in more detail hereinafter.

When sodium silicate or other alkali metal silicate is percolated through a cation exchange resin bed, the alkali metal is removed from the silicate solution and replaced by hydrogen so that an exceedingly pure silicic acid or silica hydrosol is obtained. After the resin has taken up a certain amount of alkali metal, it is washed and then regenerated with an acid such as sulfuric acid or hydrochloric acid or the like to replace the alkali metal with hydrogen with the formation of sodium sulfate or chloride depending on the acid used in the regeneration and the resin after rinsing with water is ready for another exchange cycle.

In the drawing sodium silicate solution is passed from tank 54 through line 56 by pump 58 to drum 62 containing a suitable cation exchange resin or other material and the silica hydrosol is withdrawn from drum 62 through line 64 and passed by pump 66 to storage tank 68 from which it is withdrawn through line 70 and passed to mixing tank 52 where the aluminum alcoholate and silica hydrosol may be directly mixed or mixing of these two materials may be accomplished outside tank 52 and the resulting mixture passed to tank 52. Instead of passing to storage tank 68, the silica hydrosol may be passed through by-pass line 72 to mixing tank 52. Tank 68 may be a multiplicity of tanks sized to provide an aging period of 1 to 20 hours for the silica hydrosol. Coil 74 or other heating means is provided for tank 68 for aging at elevated temperature, if desired. For example, an improvement in catalyst quality is obtainable by aging of the silica hydrosol for 1 to 5 hours at 150° to 180° F. or for 10 to 20 hours at 80° to 120° F. If desired, pH adjustment may be provided in tank 68. A pH in the range of 2 to 7 for silica hydrosol is suitable for the manufacture of silica-alumina catalyst. A more detailed description of the washing and regeneration of the cation exchange material will be given hereinafter.

The mixing of the silica hydrosol and aluminum alcoholate will now be given. The aluminum alcoholate is hydrolyzed by means of the water in the silica hydrosol when the alcoholate is mixed with silica hydrosol and the mixing or agitating is continued during the hydrolysis. The advantage of this process over similar processes lies in the fact that the water associated with a silica hydrosol containing 3 to 15% of $SiO_2$ by weight is used to hydrolyze the aluminum alcoholate to aluminum hydroxide and alcohol. Comparing this to prior processes where an alumina hydrosol containing 3 to 8% $Al_2O_3$ by weight and a silica hydrosol containing from 3 to 15% by weight of $SiO_2$ it will be apparent that in the prior processes the combined dilute solution contained much more water than is used in the process of the present invention. The attendant drying equipment was correspondingly larger.

For example, suppose 20 tons per day of bone dry catalyst, consisting of 20% $Al_2O_3$ and 80% $SiO_2$ by weight, were being made from a 3% $Al_2O_3$ hydrosol and a 6% $SiO_2$ hydrosol by mixing the hydrosols. The amount of water to be evaporated would be about 760,000 lbs. per day. On the other hand, if the aluminum alcoholate was hydrolyzed with 6% $SiO_2$ hydrosol, the amount of water to be evaporated would be only about 493,000 lbs. per day.

The following tabulation shows the difference in evaporation capacity required by the two processes in going from a 13% $Al_2O_3$ to a 40% $Al_2O_3$ catalyst containing silica, assuming a 6% $SiO_2$ hydrosol and a 3% $Al_2O_3$ hydrosol in the competitive process.

|  | This Process | Competitive Process |
| --- | --- | --- |
| Size Plant | 20 tons per day | |
| Percent $Al_2O_3$ in Product | 13 to 40 | 13 to 40 |
| Evaporation Load, Lb. $H_2O$/day | 545,200; 375,000 | 713,000; 893,333 |

From the above tabulation it will be seen that the heat or evaporation load actually decreases when making 40% $Al_2O_3$ catalyst by the process of the present invention. On the other hand the evaporation load in the competitive process increases for the 40% $Al_2O_3$ case to about 153% of the 13% $Al_2O_3$ case. This would mean that in changing from the 13% $Al_2O_3$ catalyst to the 40% $Al_2O_3$ catalyst either the daily output of the competitive plant would have to be decreased a corresponding amount or else additional drying equipment would have to be installed to maintain a constant output of catalyst. If additional equipment was provided, it would be idle when making 13% $Al_2O_3$ catalyst.

The aluminum alcoholate from line 49 or tank 48 and line 50 and the silica hydrosol from line 72 or tank 68 and line 70 may be passed through lines 78 and 82, respectively, and mixed in tank 52 by a stirrer 84 or other stirring means. Or the aluminum alcoholate from line 49 or tank 48 and line 50 and the silica hydrosol from line 72 or tank 68 and line 70 are mixed in a suitable nozzle or mixing zone 86 and the resulting mixture immediately passed to the mixing tank 52 where agitation of the resulting mixture is continued by agitating device 84. The stirring or mixing in mixing tank 52 must be maintained continuously until the hydrolysis is completed to provide small particles because gelling of the mixture takes place and if no mixing is used the mixture sets up to a gel mass which would have to be shoveled out of tank 52. The continuous mixing of the particles while they are gelling maintains them as small spherical or spheroidal particles and after mixing is completed, the mixture is a slurry of gelled particles which remains as such and can be handled as a pumpable slurry. If no agitation were used in tank 52 or the hydrolysis step, the process would not be continuous and the handling of the jelly would be much more expensive. The mixing in nozzle 86 and tank 52 is continued for a time of about 1 minute to 60 minutes or longer if desired and at a temperature of about 70° F. to 220° F., preferably 180° F. to 210° F., to substantially completely hydrolyze the alcoholate with the silica sol. By varying the amounts of silica hydrosol and the aluminum alcoholate, the amounts of $SiO_2$ and $Al_2O_3$ can be varied to make any desired composition catalyst.

The hydrolyzed mixture is then passed from the bottom of mixing tank 52 through line 92 and heat exchanger 93 by pump 94 to stripping tower 121. The hydrolyzed mixture passing from tank 52 through heat exchanger 93 in line 92 is heated to between about 180° to 220° F.

Stripping tower 121 is preferably a baffled tower which is used to remove the regenerated alcohol and the hydrocarbon from the hydrolyzed mixture. Other well known designs of distilling equipment may be used. The bottom of the tower 121 is heated by a steam coil 124 or the like to a temperature of about 200° F. to 220° F., preferably about 212° F. Instead of coil 124, open steam may be used. In stripping tower 121, alcohol, hydrocarbon and water in vapor form are removed overhead through line 126 and condenser 128 to condense liquids and the liquid condensate is passed to a separator 132 for separating the water insoluble alcohol and hydrocarbon from water, the alcohol and hydrocarbon forming the upper layer 134. The water is withdrawn through line 136 and discarded from the system through line 138 or passed all or in part through line 134A by pump 134B to stripping tower 121 as reflux. If the slurry in mixing tank 52 becomes too thick, some or all of the water from line 136 may be added back to tank 52 through line 145 by pump 144.

The mixture of alcohol and hydrocarbon containing some water is withdrawn from the upper layer 134 in separator 132 and passed through line 146 by pump 148 and through heater or heat exchanger 152 and into a dewatering or distilling tower 153. The mixture in passing through line 146 and heater 152 has its temperature raised from in the range of about 70° F. to 200° F. to a temperature in the range of about 160° F. to 250° F. A heating steam coil or the like 156 or a reboiler (not shown) is provided for the bottom of tower 153 to maintain the temperature at the bottom at about 250° to 280° F. The alcohol-hydrocarbon mixture is withdrawn substantially free of water from the bottom of tower 153 through line 158 by pump 162 and passed through the indirect heat exchanger 152 to cool the withdrawn alcohol-hydrocarbon mixture and to preheat the feed to tower 153 and then passed to the alcohol-hydrocarbon storage tank 12 above described for recycling in the process.

The vapors passing overhead from dewatering tower 153 comprise an azeotropic mixture of water, alcohol and hydrocarbon. The vapors are passed through line 164 and condenser 166 and then separator 168 to separate water from alcohol and hydrocarbon, the alcohol-hydrocarbon mixture forming the upper layer 172 in separator 168. The alcohol-hydrocarbon mixture is withdrawn through line 174 by pump 176 and all returned to the top of tower 153 as reflux. The water layer is withdrawn through line 178 by pump 182 and withdrawn as excess water from the process through line 138 or utilized as a water addition to mixing tank 52 via line 142 as above described. By recycling the water from separators 132 and 168 any dissolved or mixed alcohol is recovered and reused.

Returning now to the silicia alumina slurry in the bottom of stripping tower 121, the slurry is withdrawn through line 184 and passed by pump 186 through line 188 and then treated in one of a plurality of ways to provide a dry silica alumina catalyst of the desired composition. From line 188 the water slurry (85–95% water) can be passed through line 192 to a high pressure (500 to 4000 p. s. i. g.) drier feed pump 194 and thence through one or more spray nozzles 196. When one nozzle is used it is approximately centered on the vertical axis of a large cylindrical vessel 198 provided with a conical bottom 201. Hot drying gas enters the vessel 198 tangentially through line 203 preferably at a plurality of points on the periphery of the cylindrical section and exhausts from the center of the top of the cylindrical section through line 205. The hot drying gas may be produced in any suitable manner as by burning fuel gas in air. The exhaust gases are preferably passed through a cyclone separator or other dust separating means 207 for recovering finely divided catalyst particles which are collected in dip leg 209 with the flue gas going overhead through line 211c.

The major portion of the dried spherical gel particles passes downward through the spray drier and the particles are removed in any suitable manner from the bottom of the conical section 201 by screw feed means 211 into which feeds the recovered catalyst from dip pipe 209. The dried catalyst is passed to storage or shipped and may be further treated as desired as for example by heating the catalyst to about 350° to 500° F. for about 1 to 3 hours. For this purpose, dried catalyst from screw feeder 211 is passed by line 211A to hopper 249 and thence to drier 251. The spherical particles will have a size in the range of about 10 to 250 microns, preferably 20 to 120 microns.

In another finishing method the water slurry (85 to 95% water) of silica and alumina is passed through line 213 and passed to a mixing tank 215 provided with a stirrer or agitator 217 to maintain the slurry in pumpable form. Water may be added to tank 215 from line 219, if desired or necessary. Slurry is withdrawn from the bottom of tank 215 through line 221 and passed through line 223 by pump 225. The slurry is fed to spray drier 198 as above described to produce dry gel particles of silica alumina. If desired, a portion of this slurry passing through line 223 is returned via line 227 to mixing tank 215 in order to maintain a rapid flow through the feed line to pump 194 and thereby prevent settling of solids in the line.

In another finishing method, the water slurry from stripping tower 121 is passed through line 229 to a rotary vacuum filter 231 shown as a horizontal table type but other forms may be used. The filtrate is withdrawn through line 233 and receiver 235. A part or all of the water or filtrate is discarded from the process through line 237 and a part of the water may be passed through line 219 as above described for addition to the mixing tank 215. The filter cake containing 70 to 90% water and comprising small gel particles is withdrawn by screw means 239 and delivered to a moving belt 241. The filter cake from the upper end of the moving belt 241 is passed to line 243 in any suitable manner and may be passed by line 245 to mixing tank 215 where it is reslurried with some water such as filtrate from line 219 to form a pumpable slurry having the desired solids concentration which is passed through line 223 and related equipment and spray dried in spray drier 198 to form spheroidal particles.

In another finishing treatment the filter cake from line 243 is passed through line 247 to hopper 249 from which it is fed to a conventional rotary kiln drier 251, the hard dried adsorbent gel particles being fed into hopper 253 and ground in a grinding means 255 to the desired size and stored or shipped. The ground particles are withdrawn through line 256. Cyclone separator 254 and associated equipment may be provided for hopper 253, if desired. Flue gas leaves through line 255A. Instead of using lines 243, 245 and 247, a suitable conveyor or conveyors may be used.

In another finishing treatment the water slurry containing silica-alumina particles from line 192 or from line 223 is passed through line 261 to spray nozzle 263 in a spray tower 267 arranged above a body 265 of hydrocarbon oil such as kerosene, heavy naphtha, light gas oil, etc. or partially water miscible organic liquid such as butanol, amyl alcohol, diethyl ketone, mesityl oxide, valeric aldehyde, valeric acid, propionitrile, acrylonitrile, etc. If desired, mixing spray nozzle 263 may be located below the surface 269 of liquid body 265. In place of mixing spray nozzle 263, a rotating disc type sprayer or other dispersing means may be employed. The body 265 of liquid in tower 267 is preferably quiescent and at a temperature of about 120° to 200° F. to accelerate gelling and drying of the particles as they fall through the body of oil or other liquid.

The preferred form of spray tower 267 has a funnel shaped bottom 272 and the spheroidal hydrogel particles of silica-alumina composite fall to the bottom of the tower from which they are carried upwardly in oil through an inclined tubular member 274 and then down through a vertical pipe 276 to oil-gel separator 278. Pipe 276 extends a substantial distance into separator 278. The upper end of tubular member at 282 should be at about the same level as the upper level 269 of the oil bath in spray tower 267 so as to maintain the system in hydrostatic balance. Oil to which an emulsifying agent such as long chain aliphatic amines or amine salts, partial esters of polyhydric alcohols, alcohol sulphates, hydrocarbon sulphonic acids, lecithin, or various commercial emulsifiers such as Daxad, Tween, Span, Alkaterge, Aerosol, etc., has been added, if desired, is introduced through line 284 at the bottom of tubular member 274 to assist in moving the gel particles upwardly therethrough, or through one or more lines 286 into spraying tower 267. By varying the size and length of tube 274, the gel particles may be aged during passage therethrough for the desired time.

Instead of spraying the slurry of alumina and silica hydrogel into a quiescent liquid in tower 267, the mixture may be sprayed into the body of oil similar to that described in tower 267 and the mixture stirred or agitated to form an emulsion of the mixture in oil which then sets to spheroidal particles during stirring in the tower. In this case the oil or other organic liquid preferably contains an emulsifying agent above referred to. The actual diameters of the spheres obtained by the emulsion technique depend on the degree of dispersion which is a function of the viscosity of the dispersion medium and the degree of agitation or stirring. The final dried microspheres made by the emulsion technique will have a particle size between about 5 and 250 microns with most of the particles being between about 20 and 120 microns.

In oil-gel separator 278 the oil separates as an upper layer 288 and water, introduced by line 290, containing the gel particles separates as lower layer 292. Oil from layer 288 is passed by line 294 to tank 296 from which it is pumped by pump 298 through indirect heat exchanger 302 where it is heated by steam and then through lines 303 and 304 and 284 into the lower end of inclined tubular member 274 or into spraying tower 267 as above described. Emulsifying agents, if desired for maintaining the particles in discrete form, may be introduced into line 303 through line 306.

The silica-alumina spheroidal gel particles and water are withdrawn from the bottom of oil-gel separator 278 through line 308 and passed to a suitable filter 312, as for example, a horizontal suction type filter but any filter may be used, and the separated gel particles are withdrawn through screw feed or other means 314 to a belt conveyor 316 and passed to drier feed hopper 249 above described. In this case the spheroidal particles from hopper 253 are withdrawn through line 317. The separated water is withdrawn through line 318 into air-water separator 322 and together with any make-up water added at 324 is passed by pump 326 through indirect heat exchanger 328 where it is heated with steam and then pumped through line 290 and returned to the water layer 292 in oil-gel separator 278. If desired, heat exchangers 302 and 328 may be partially or completely by-passed by lines 330 and 332, respectively. Air is removed from separator 322 through line 334 by a vacuum pump not shown.

The system above described for spraying and forming the gel particles in oil is subject to numerous modifications which will occur to those skilled in the art. For example, the oil spraying tower may be operated upflow in which case it is preferred to use an oil or other liquid heavier than water.

In place of passing the hydrolyzed mixture containing regenerated alcohol and hydrocarbon from mixing zone 52 to stripper 121, the stripper may be omitted, if desired. This is not the preferred procedure, however. If desired, the hydrolyzed mixture in mixing tank 52 may be passed by lines 96 and 192 directly into spray dryer 196 by means of high pressure feed pump 194. In this case, the gaseous products from drier 198 contain water vapor, water-immiscible or partially water-immiscible alcohol vapor and/or hydrocarbon vapors and air and these gaseous products may be condensed in a cooling tower provided with a water spray and the condensed liquid then sent to a separator for reclaiming the alcohol and/or hydrocarbon as a separate layer from the water. The water from the separator may be cooled and recycled to the cooling tower; or the water may be treated to recover any residual water-immiscible alcohol and/or hydrocarbon and then the water used in preparing silica sol, as for example, by diluting concentrated sodium silicate solution before passing the silicate solution through the cation exchange zone. Or the water-immiscible or partially water-immiscible alcohol and/or hydrocarbon may be reclaimed by distillation prior to using the water for preparing the silica hydrosol. The reclaimed or recovered alcohol and/or hydrocarbon in substantially anhydrous form may be passed to storage tank 12 for reuse in the process.

Referring now to the cation exchange section for making silica hydrosol, after the exchange cycle has been run for some time it is necessary to regenerate the cation exchange material. As shown in the drawing more than one drum for containing cation exchange material is preferably used so that while one drum or exchange vessel of cation exchange material is being used for producing silica hydrosol, another drum of cation exchange material will be on the first washing step, another on the acid regeneration step and another on the final washing step.

The time when regeneration is necessary may be determined by the pH of the hydrosol effluent from the resin bed. However, it is preferred to predetermine the capacity of the resin for removal of soda from sodium silicate in a small experimental exchange resin bed. From this data the capacity of the resin bed 62 may be calculated. It is preferred to operate resin bed 62 at only about 90% of its capacity in order to allow a reasonable factor of safety.

In Fig. 1, zones 62, 356, 378 and 384 are all identical cation exchange zones. In operation concentrated sodium silicate of about 40° Bé. is withdrawn from tank 340 by pump 342 and line 344 and mixed in mixer 346 with previously used wash water following an exchange step presently to be described from pump 348 and line 350 and the mixture is passed to sodium silicate feed tank 54. The diluted sodium silicate solution in tank 54 is about 1.03 to 1.15 specific gravity and is passed through line 56 by pump 58 as above described into the bed of cation exchange resin in drum 62. Silica hydrosol is withdrawn through line 64 as above described. The silica hydrosol has a concentration of silica of about 3 to 15% by weight.

After the capacity of the resin for soda has been exhausted to the degree desired, the flow of sodium silicate solution from tank 54 is stopped. The system is now ready for the first water washing step. Water from line 352 is passed through line 354 into the resin bed in tank 356. One to two volumes of water per volume of resin bed in vessel 356 may be used for this first wash. The flow rate of the water may be from 0.5 to 1.5 gal. per min. per cu. ft. of resin. After the flow of sodium silicate is stopped, there is still silica hydrosol containing some sodium silicate in the bed. The water wash will remove this silica hydrosol which can be recovered. This silica hydrosol and alkali metal silicate passes through line 358 to storage tank 360 from which it is passed through line 350 to the sodium silicate dilution step above described. Excess solution may be removed through line 362.

Following this washing step the cation exchange bed is now ready for the regeneration step. Concentrated sulfuric acid is withdrawn from tank 364 by line 368 and pump 370 and is diluted by mixing with water from line 372 in a mixer 374 to about 3 to 10% by weight sulfuric acid preferably about 5% sulfuric acid and the diluted acid is passed through line 376 upwardly through drum 378. After passage through the cation exchange bed, the acid solution passes through line 380. During regeneration, sodium sulfate is formed and this may be recovered from the spent regenerating solution leaving through line 380.

Following the regeneration step the cation exchange resin or other material bed is now ready for the final water wash step. Water from line 352 passes through line 382 and passes preferably upwardly through the regenerated cation exchange bed in drum 384 to remove sodium sulfate and sulfuric acid. The wash water is then passed through line 386 and leaves the process. Vessel 384 may be drained to any desired level at any desired time by means of valved line 388.

In the acid regeneration it is preferred to use only the amount of acid that is necessary to restore the exchange resin to substantially its initial capacity for converting sodium silicate into silica hydrosol. With resins of the strong acid type containing sulfonic acid groups for example, this may be as much as about twice the stoichiometrical equivalent of the sodium in the sodium silicate used to make the silica sol; with resins of the weak acid type, such as those containing carboxylic acid groups, for example, this may be the stoichiometrical equivalent of the sodium silicate used to make the silica sol. Washing after acid regeneration is continued until the effluent water is substantially free of the acid radical used in the regeneration step. Some of this effluent wash water from line 386 may be used to dilute the concentrated acid from tank 364.

The silica hydrosol produced from the sodium silicate and withdrawn through line 64 has nearly the same concentration of silica as the sodium silicate solution used. With the cation exchange resin method the silica hydrosol produced is substantially free of sodium ions and has a sodium content of less than about 0.2%, preferably less than about 0.1% calculated as sodium oxide on a dry basis. The aluminum alcoholate solution produced by the alcoholate process described above may contain about 20 to 50 grams of aluminum metal per liter.

It will be understood that the above description of the cyclic process for producing silica hydrosol by means of exchange resins is merely illustrative of one adaptation of this process. In order to make the process continuous, it is desirable to operate several exchange resin drums on a staggered schedule such that at all times one or more of the drums are on the silica hydrosol production step while the remaining drums are on the washing and regeneration steps. The process may be made fully automatic by means of suitable instruments, well known to those skilled in the art. These instruments may control the time utilized in each step, the valving arrangements, the flow rates in the various lines, the liquid level in the exchanger drums and so forth. The flows may be diverted by instruments which are actuated by the properties of the stream leaving the exchanger bed during any step of the cycle such as the pH of the silica hydrosol or the electrical conductivity of the wash water. In the above description of this process a part of the streams passes downflow through the exchanger bed while the remainder of the streams passes through this bed upflow. It will be understood that any of the streams including the sodium silicate stream, the regenerating acid stream, and the two wash water streams may be made to pass either downflow or upflow through the exchanger bed as desired.

The aluminum alcoholate and silica hydrosol produced as above described can be mixed in any proportions to give a catalyst having the desired amount of alumina in the final catalyst composition and catalysts having a silica content of 1 to 99% by weight and an alumina content of about 99 to 1% by weight can be made and the results are reproducible.

After making the dry gel particles of silica and alumina, the particles may be further dried and activated at a temperature in the range of about 800° to 1400° F. for 1 to 3 hours, if desired.

A specific example of the process will now be given in connection with the specific apparatus disclosed but it is to be expressly understood that the invention is not restricted thereto as changes and modifications can be made without departing from the spirit of the invention. At the start for a plant to make about 46 tons per stream/day of silica-alumina catalyst where the catalyst contains about 13% alumina by weight with the rest being silica and with a process where two reactors are used alternately to provide a continuous process, about 300 pounds of metal aluminum in granulated form of $\frac{1}{16}''$ to $\frac{1}{8}''$ in size are charged to the reactor 10 and the reactor is sealed. With the amount of aluminum above set forth about 0.3 pound of mercuric chloride is added. Inert gas such as flue gas is introduced into the reactor for about 10 minutes to purge the reactor of air after which about 120% of the stoichiometric quantity of amyl alcohols (a commercial mixture of the alcohols) required and an equal volume of petroleum hydrocarbons boiling in the range of 220° to 290° F. are pumped into the reactor 10. The reactor is heated to about 240° F. Heat of reaction is removed by recycling and cooling through line 32 and reflux through line 44. After about 25 to 60 minutes the reaction is complete and the aluminum alcoholate and excess amyl alcohol and hydrocarbons are pumped out into a storage tank 48. About 22 such batches are required for 46 tons/days of 13% $Al_2O_3$ catalyst. During removal of the alcoholate the reaction vessel 10 is purged with inert gas to remove residual hydrogen.

The concentrated sodium silicate is diluted to a silicate solution containing about 62 grams of silica per liter. The cation exchange resin to be used in tank 62 comprises Amberlite resin IR–120, but the invention is not to be restricted thereto. The amount of resin in vessel 62 is about 650 cubic feet. The amount of silica hydrosol produced per exchange step is about 7300 gallons and the rate of flow of silicate solution through the resin bed during the exchange step is about 0.6 gallon per cubic foot of resin per minute. The pure silica hydrosol obtained from the diluted sodium silicate is about a 6% hydrosol. This silica hydrosol is transferred to tank 68 where it is aged for about 5 hours at 150° F. About 22 such batches of silica sol are required for the production of 46 tons per day of 13% aluminum, 87% silica catalyst.

Aluminum alcoholate solution and silica hydrosol in the proportions by volume of about 1:7, respectively, are withdrawn from tanks 48 and 68, respectively, and transferred by lines 50 and 70, respectively, into agitated vessel 52 where the alcoholate is hydrolyzed and mixed with the silica sol to form an aqueous slurry of jelly and receive an additional aging period of about one hours at 150° F. Aged slurry of jelly is withdrawn from vessel 52 by line 92 to stripper 121 where the regenerated alcohol and hydrocarbon mixture is stripped out and removed overhead. The aqueous slurry of jelly is passed through lines 184, 188 and 192 by pump 186 in the suction of high pressure pump 194, which forces the slurry into spray drier 201 where the jelly is dried to hard spherical particles of gel catalyst comprising about 13% alumina and about 87% silica on a dry basis.

A sample of catalyst was prepared in the laboratory by the method according to this invention.

A 5 wt. percent silica hydrosol was prepared by exchanging the sodium ion of sodium silicate for the hydrogen ion of Amberlite IR–120 exchange resin. An aluminum alcoholate solution in a petroleum hydrocarbon plus an unreacted mixture of amyl alcohols was prepared by reacting a mixture of 50 volume percent of a petroleum hydrocarbon boiling in the range of 300° to 400° F. with 50% mixed amyl alcohols with metallic aluminum in the presence of $HgCl_2$ promoter. The concentration of the aluminum alcoholate in the solution was equivalent to about 4 wt. percent $Al_2O_3$.

After aging the silica sol for about one hour it was heated to 200° F. The hot silica sol and aluminum alcoholate solution at a temperature of about 200° F. were then metered to a mixing pump at rates of 0.545 gallon per minute and 0.14 gallon per minute, respectively. The mixing pump served as a zone of violent agitation. The agitation lated for a time sufficient to form silica-alumina gel particles. The resulting slurry of silica-alumina gel particles was pumped into suitable containers and dried. The dried product contained 13.7 wt. percent $Al_2O_3$ the rest being silica and less than 0.5% impurities.

The finished catalyst was ground, pilled and heated to 1000° F. Thereafter, it was artifically aged by contacting with steam for 24 hours at 1050° F. and 60 p. s. i. g. pressure. The catalyst was then subjected to a laboratory cracking test, which is described below. The catalyst prepared according to this invention proved to be definitely better than silica-alumina cracking catalyst which is sold on the open market, as shown by the data presented below:

```
                              200 cc. unit cracking test
Catalyst Pretreatment_____ Heated to 1000° F., Steamed 24 Hrs.
                                at 1,050° F. and 60 p. s. i. g.
Cracking Conditions:
    Amount of Catalyst_____ 200 cc.
    Temperature, ° F_____ 950.
    Feed_____ East Texas light gas oil.
    Feed rate, ml.¹/hr_____ 480.
    Length of test_____ 30 min.
    Quantity feed, ml.¹_____ 240.
  ¹ Ml.=millilitres.
```

|  | Catalyst Prepared By Our Method | Commercially Available Catalyst |
| --- | --- | --- |
| Vol. Percent D+L | 31.5 | 27 |
| Wt. Percent Conversion | 35.4 | 30.2 |

The activity of a cracking catalyst is indicated by the amount of gas oil feed cracked or converted to other products when the vaporized gas oil is contacted with the hot catalyst. The activity is designated as conversion on the basis of a standardized laboratory test. The basic test has been described in the chemical literature (see Conn, M. E., and Connolly, G. C., Ind. Eng. Chem., 39, p. 1130, September 1947). The test is carried out in a reaction tube which contains 200 cc. of pilled catalyst. The testing unit is referred to as a 200 cc. testing unit. In the basic test described in the literature the catalyst bed is in a heated reaction tube. The bed is maintained at about 850° F. and the oil to be cracked (East Texas light gas oil in this case) is vaporized and passed through this bed at the rate of 120 milliliter per hour. The cycle requires two hours during which 240 ml. of oil is cracked. The data presented above were obtained by a test procedure which is a slight modification of the basic test. The catalyst bed is maintained at about 950° F. instead of at about 850° F., and the oil to be cracked (East Texas light gas oil) is vaporized and passed through the bed at the rate of 480 ml./hr. instead of at 120 ml./hr.

This feed rate is maintained for 30 minutes instead of for 2 hours, during which 240 ml. of oil is cracked.

In the cracking operation, gases and coke are formed as well as normally liquid hydrocarbons, with the coke being deposited on the catalyst. The cracked liquid product is examined for gasoline content in the ASTM D-86-46 distillation apparatus. The amount of gasoline distilled from 100 ml. charge of the cracked liquid product up to a final vapor temperature of 400° F. is designated as distillate or "D." The residual portion left in the flask is measured and may be designated as "R." The loss or "L" is determined by subtracting the sum of $D+R$ from 100. The sum of $D+L$, or distillate plus loss, is a criterion of activity and selectivity since it shows the yield of desirable product such as gasoline produced. The measure of conversion is obtained by subtracting the gas oil residual material (R) based on feed from 100.

The commercial catalyst with which the new preparation is compared was prepared as follows: A solution of 28° Bé. sodium silicate was mixed with a 32° Bé. solution of sulfuric acid. The resulting silica hydrosol was allowed to set (about 4 hours) to a hydrogel. The lump hydrogel was then transferred to a vat and washed substantially free of sodium and sulfate ions.

The silica hydrogel was next soaked in a solution of aluminum sulfate until the gravity of the supernatant liquid had decreased from 31° Bé. to about 20.2° Bé. This left an equivalent of about 13% alumina (by weight of finished product) on the silica hydrogel.

After the aluminum sulfate impregnating solution was drained off, the gel was treated with aqua ammonia (5% NH₃) in order to convert the aluminum sulfate to alumina ($Al_2O_3$) and fix the alumina in the pores of the silica hydrogel.

The mixture of silica and alumina was then washed substantially free of ammonium sulfate, dried and ground to the desired particle size.

The dry powder of silica and alumina catalyst was then pilled, steamed as described above and tested for catalytic cracking activity after steaming.

What is claimed is:

A method for preparing a cracking catalyst which comprises forming a substantially pure silica hydrosol, reacting aluminum and a substantially anhydrous water insoluble alcohol having at least 5 carbon atoms per molecule to form an anhydrous aluminum alcoholate solution, said water insoluble alcohol being used in an amount in excess of the stoichiometric amount, mixing said silica hydrosol and anhydrous alcoholate solution to hydrolyze the alcoholate, violently agitating the mixture until the aluminum alcoholate is substantially completely hydrolyzed and a pumpable slurry of silica-alumina spheroidal gelled particles is formed, heating the pumpable slurry and passing it directly to a stripping zone, heating the slurry in said stripping zone to a temperature of about 200–220° F. to remove water insoluble alcohol and some water overhead from said stripping zone, condensing the overhead and allowing settling to separate water insoluble alcohol from water, returning at least part of the water to the upper portion of said stripping zone as reflux thereto, recovering the separated alcohol and drying it for reuse for the production of additional anhydrous aluminum alcoholate in solution, withdrawing a water slurry of silica-alumina particles from the bottom of said stripping zone and spray drying the water slurry to form hard dry spheroidal silica-alumina catalyst particles.

References Cited in the file of this patent

UNITED STATES PATENTS

| | | |
|---|---|---|
| 1,016,864 | Wilbuschewitsch | Feb. 6, 1912 |
| 2,292,708 | Mavity | Aug. 11, 1942 |
| 2,348,647 | Reeves et al. | May 9, 1944 |
| 2,435,158 | Read | Jan. 27, 1948 |
| 2,437,533 | Huffman | Mar. 9, 1948 |
| 2,446,784 | Daley et al. | Aug. 10, 1948 |
| 2,457,970 | Bailie | Jan. 4, 1949 |
| 2,467,470 | Gerhold et al. | Apr. 19, 1949 |
| 2,471,000 | Messenger | May 24, 1949 |
| 2,579,251 | Coates et al. | Dec. 18, 1951 |
| 2,582,254 | Hunter | Jan. 15, 1952 |
| 2,595,339 | Herder et al. | May 6, 1952 |
| 2,713,037 | Kimberlin | July 12, 1955 |